D.C. INSERTION APPARATUS FOR A COLOR-TELEVISION RECEIVER

Filed Dec. 4, 1961

United States Patent Office 3,113,177
Patented Dec. 3, 1963

3,113,177

D.C. INSERTION APPARATUS FOR A COLOR-TELEVISION RECEIVER

Peter S. Carnt, Northolt Park, and Eric Ribchester, Hanworth, Middlesex, England, assignors to Hazeltine Research Inc., Chicago, Ill., a corporation of Illinois Filed Dec. 4, 1961, Ser. No. 156,899
Claims priority, application Great Britain Dec. 9, 1960
1 Claim. (Cl. 178—5.4)

Figure 1:
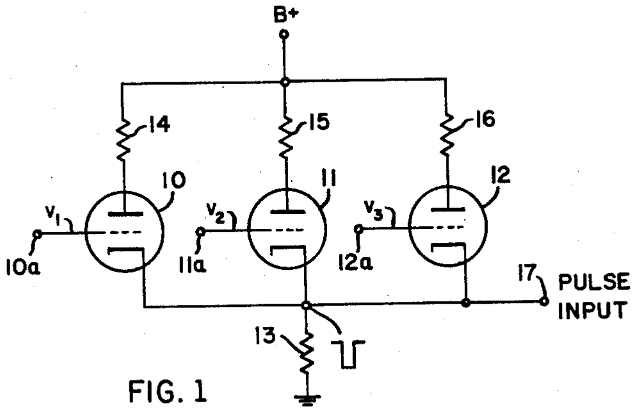

This invention relates to color-television systems and in particular to systems of the kind wherein there are developed for application to a picture reproduction device a luminance signal, whose magnitude is proportional to a quantity Y equal to $lR+mG+nB$, where R, G and B respectively represent the magnitudes of red, green and blue components of the scene to be televised and $$l+m+n=1$$

and three color-difference signals, whose magnitudes are respectively proportional to the quantities $(R-Y)$, $(G-Y)$ and $(B-Y)$ and each of which has a form such that during intervals between video signals representing successive lines of a frame there occur portions of the signal maintained at a reference level with respect to which the video signals may have excursions of both polarities.

The invention relates more particularly to signal-translating apparatus for clamping the direct-current levels of the color-difference signals in the chrominance channel of the system. Heretofore, it has been proposed that such apparatus should comprise three electric valves, for example, of the triode type, with color-difference signals being respectively applied between the cathodes and control grids of the three valves via three capacitances each arranged to have a discharge time constant which is long compared with the period of signals representing one line of a frame. In addition, there is applied respectively between the cathodes and control grids three trains of pulses of uniform magnitude, the pulses in each train occurring during the portions of the color-difference signals which are maintained at a reference level. In such an arrangement the pulses cause current flow between the electrodes to which they are applied thereby maintaining the charges on the capacitances, and hence the direct-current levels of the signals appearing at the anodes of the valves, at a substantially constant level. The direct-current levels of the output signals remain substantially constant despite changes in the characteristics of the valves due, for example, to ageing, but changes in the relative direct-current levels of the output signals may occur owing to changes in the relative magnitudes of the pulses in the different trains of pulses.

It is an object of the present invention to provide apparatus for clamping the direct-current levels of the color-difference signals in apparatus of the kind specified wherein this disadvantage is overcome.

For a better understanding of the present invention, together with other and further objects thereof, reference is had to the following description, taken in connection with the accompanying drawing, and its scope will be pointed out in the appended claims.

Figure 2:
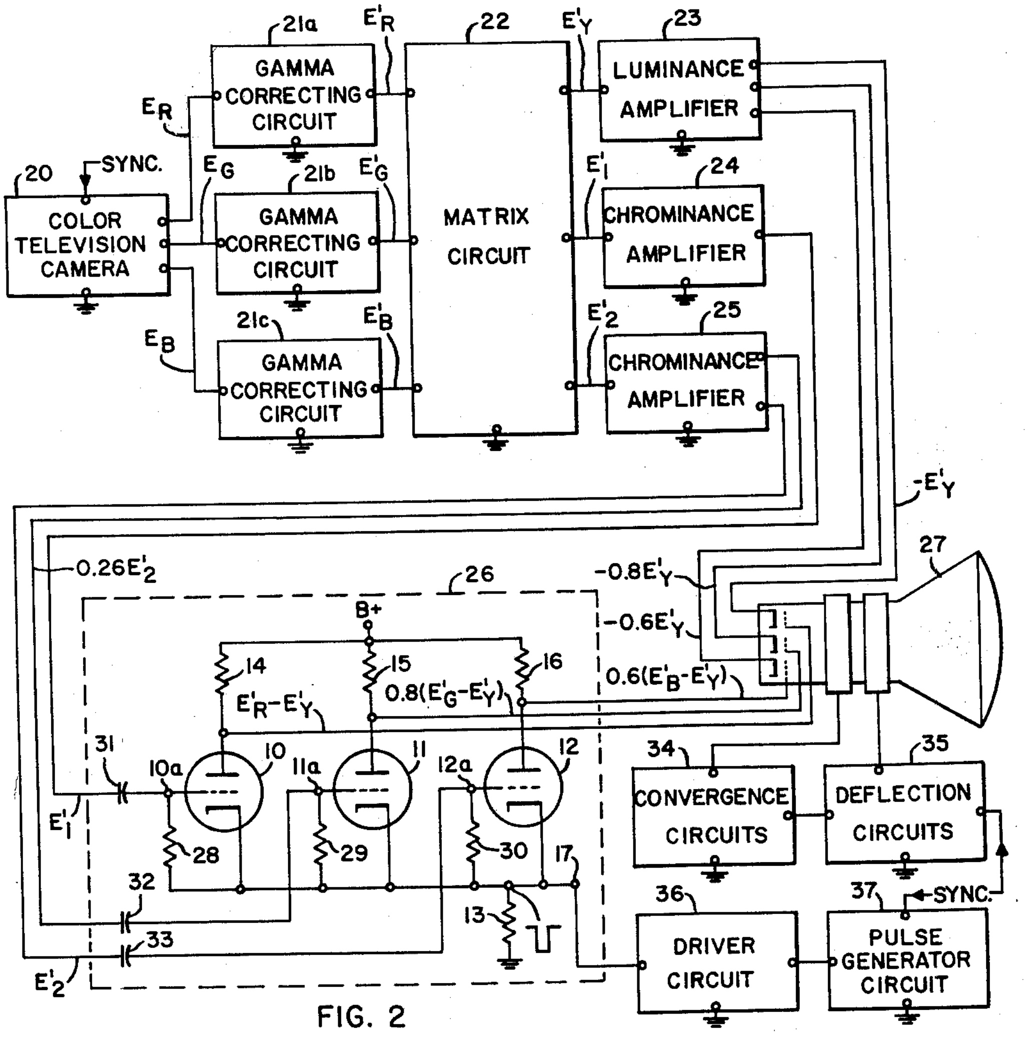

Referring to the drawing:

FIG. 1 is a representative circuit which may be used in connection with the present invention, and FIG. 2 is a diagram of a color-television monitoring apparatus embodying the present invention.

Before considering, in detail, the embodiments set out in the drawing it will be helpful to first consider the present invention in general terms. Thus, according to the present invention, in color-television apparatus of the kind specified a signal-translating apparatus for clamping the direct-current levels of the color-difference signals may include three identical electric valves each having an anode, a cathode and a control grid, each valve having an amplification factor $\mu$ and an anode resistance of $R_a$ ohms, and each valve being provided with a separate anode load of impedance $R_L$ ohms. There is then connected between its cathode and control grid a circuit including a capacitance, a signal source and a pulse source all connected in series, there being a separate capacitance and signal source in each circuit but at least the pulse source being common to all three circuits so that said circuits provide an impedance of $R_c$ ohms common to all three valves. The signal sources provide signals $v_1$, $v_2$ and $v_3$, respectively, which signals are respectively constituted by mixtures of color difference signals in the proportions:

$$[1-A(2+p)](R-Y)+A(b-q)(B-Y):$$
$$A(1-p)(R-Y)+[b-A(2b+q)](B-Y):$$
$$[-p+A(2p+1)](R-Y)+[-q+A(2q+b)](B-Y)$$

where $$A=\frac{(\mu+1)R_c}{R_L+R_a+3(\mu+1)R_c};\ p=\frac{l}{m}g;\ q=\frac{n}{m}g$$

$(R-Y)$, $(G-Y)$, and $(B-Y)$ are color-difference signals; and $b$ and $g$ are numbers other than zero and represent the ratios of output signals across two of said anode loads $R_L$ in relation to the output signal across the third of said anode loads $R_L$, and $l$, $m$ and $n$ are coefficients of the equation for the luminance signal $lR+mG+nB=Y$.

Each of the capacitances has a discharge time constant which is long compared with the period occupied by the signals representing one line of a frame. The pulse source provides a train of pulses of uniform magnitude, the pulses occurring during the portions of the color-difference signals which are maintained at a reference level and have a magnitude and polarity such that grid current flows in all the valves only during the application of the pulses.

In operation of apparatus in accordance with the invention, there appear respectively at the anodes of the three valves color-difference signals having magnitudes respectively proportional to the quantities $(R-Y)$, $(G-Y)$ and $(B-Y)$ in the ratios $1.0:g:b$.

In an arrangement in accordance with the invention the possibility of changes in the relative direct-current levels of the output signals is clearly eliminated since the same train of pulses is applied to each of the three valves. Such an arrangement, however, essentially results in a degree of matrixing between the input signals so that the signals appearing at the anodes of the three valves are not the same as the input signals respectively applied to the valves. In an arrangement in accordance with the invention, this difficulty may be overcome by arranging for the input signals $v_1$, $v_2$ and $v_3$ to be so constituted that the desired output signals are produced as a result of said degree of matrixing.

It will be noticed that each of the signals $v_1$, $v_2$ and $v_3$ is zero when the scene to be televised is "black and white." In consequence, any channel handling any of the signals $v_1$, $v_2$ and $v_3$ prior to the direct-current clamping handles no signal when the scene to be televised is "black and white" so accurate grey-scale tracking may be achieved in an equipment in which apparatus in accordance with the invention is used. In addition, the direct-current clamping circuit itself has perfect symmetry in the output circuits and this further leads to accurate grey-scale tracking.

In a preferred arrangement in accordance with the invention the input signal $v_3$ is obtained by adding together fractions $c$ and $d$ respectively of the other two input signals $v_1$ and $v_2$, the values of $c$ and $d$ being defined by the equations:

$$c=\frac{A(b+q+pb)-pb}{b-A(b+q+pb)}$$

$$d=\frac{A(b+q+pb)-q}{b-A(b+q+pb)}$$

Such an arrangement has the advantage that, prior to direct-current clamping, the video frequency chrominance information signals may be handled in two separate channels instead of three.

In a particularly preferred arrangement in accordance with the invention $$l=0.30;\ m=0.59;\ n=0.11;\ b=0.6;\ g=0.8;\ c=0 \text{ and } d=0.26$$

The values for $c$ and $d$ result in the value of A being 0.245 and the input signals may then be found to be:

$$v_1 \alpha -0.41(R-Y)-0.11(B-Y)$$
$$v_2 \alpha -0.146(R-Y)-0.27(B-Y)$$
$$v_3=0.26v_2$$

and therefore:

$$v_3 \alpha -0.038(R-Y)-0.07(B-Y)$$

By way of further explanation, the manner in which the constitution of the input signals $v_1$, $v_2$ and $v_3$ may be calculated will now be described with reference to FIGURE 1 of the accompanying drawings which is a diagram illustrating the basic circuit arrangement of an apparatus in accordance with the invention.

Referring now to FIGURE 1 of the drawing, the basic circuit arrangement includes three identical electric valves 10, 11 and 12 each having a cathode, a control grid and an anode, and each having an amplification factor $\mu$ and an anode resistance $R_a$. A common impedance 13 having a value of $R_c$ ohms is connected between the cathode of each of the valves 10, 11 and 12 and ground. Three further impedance elements 14, 15 and 16 each having an impedance of $R_L$ ohms are respectively connected between the anodes of the valves 10, 11 and 12 and a potential source B+.

By conventional valve theory it is found that the output signals $e_1$, $e_2$ and $e_3$ appearing respectively at the anodes of the valves 10, 11 and 12 are given by the equations:

$$e_1=-C[v_1-A(v_1+v_2+v_3)] \quad (1)$$

$$e_2=-C[v_2-A(v_1+v_2+v_3)] \quad (2)$$

$$e_3=-C[v_3-A(v_1+v_2+v_3)] \quad (3)$$

where $$A=\frac{(\mu+1)R_c}{R_L+R_a+3(\mu+1)R_c},\quad C=\frac{\mu R_L}{R_L+R_a}$$

and $v_1$, $v_2$ and $v_3$ are signals applied between the respective control grids of the valves 10, 11 and 12 and ground. It is required that $e_1:e_2:e_3::(R-Y):b(B-Y):g(G-Y)$ Hence $$(R-Y)=-K[v_1-A(v_1+v_2+v_3)] \quad (4)$$

$$b(B-Y)=-K[v_2-A(v_1+v_2+v_3)] \quad (5)$$

$$g(G-Y)=-K[v_3-A(v_1+v_2+v_3)] \quad (6)$$

since $$lR+mG+nB=Y$$

and $$l+m+n=1$$

therefore $$l(R-Y)+m(G-Y)+n(B-Y)=0$$

$$g(G-Y)=-\frac{l}{m}g(R-Y)-\frac{n}{m}g(B-Y)$$

let $$\frac{l}{m}g=p \text{ and } \frac{n}{m}g=q$$

then Equation 6 may be written $$-p(R-Y)-q(B-Y)=-K[v_3-A(v_1+v_2+v_3)] \quad (7)$$

The Equations 4, 5 and 7 may now be solved for $v_1$, $v_2$ and $v_3$ by adding the three equations, solving for $$(v_1+v_2+v_3)$$

and substituting the result in each equation in turn. It is found that $$(1-3A)Kv_1=-[1-A(2+p)](R-Y)-A(b-q)(B-Y) \quad (8)$$

$$(1-3A)Kv_2=-A(1-p)(R-Y)-[b-A(2b+q)](B-Y) \quad (9)$$

$$(1-3A)Kv_3=-[-p+A(2p+1)](R-Y)-[-q+A(2q+b)](B-Y) \quad (10)$$

It is possible to derive the input voltage $v_3$ by adding together fractions $c$ and $d$ respectively of the input signals $v_1$ and $v_2$. From Equations 8, 9 and 10 it is seen that the values of $c$ and $d$ for this are defined by the equations:

$$-p+A(2p+1)=c[1-A(2+p)]+d.A(1-p)$$
$$-q+A(2q+b)=c.A(b-q)+d[b-A(2b+q)]$$

which give $$c=\frac{A(b+q+pb)-pb}{b-A(b+q+pb)} \quad (11)$$

$$d=\frac{A(b+q+pb)-q}{b-A(b+q+pb)} \quad (12)$$

In any particular apparatus the terms $b$, $p$ and $q$ are given; Equations 11 and 12 indicate that a value for any one of the terms $c$, $d$ or A may be chosen independently of other considerations, and the corresponding values for the other two of the terms $c$, $d$ and A then found. Thus, a value for A, which as indicated by Equations 8, 9 and 10 gives the amount of feedback in the circuit, may be chosen and the corresponding values of $c$ and $d$ found from the Equations 11 and 12; alternatively, the value of $c$ or $d$ may be chosen, say $c$, and the corresponding values for $d$ and A found from the Equations 11 and 12. The value of either $c$ or $d$ may be zero so that the input voltage $v_3$ is derived from one only of the other two input voltages $v_1$ and $v_2$.

One specific arrangement in accordance with the invention will now be described, by way of example, with reference to FIGURE 2 of the accompanying drawing which is a circuit diagram of a color-television system for monitoring the signals appearing at the output of a three-color-television camera.

Referring to FIGURE 2 of the drawing, the camera 20, whose operation is controlled by line synchronizing pulses derived from a conventional source (not shown), is arranged to produce simultaneously three output signals $E_R$, $E_G$ and $E_B$ which are respectively representative of red, green and blue components of a scene to be televised, the magnitudes of the three signals being equal for a white portion of the scene to be televised. Each of the signals $E_R$, $E_G$ and $E_B$ has a form such that during intervals between video signals representing successive lines of a frame there occur portions of the signal maintained at a blanking level which is the same for all three signals. The camera output signals are respectively fed to three conventional gamma correcting circuits **21*a*, 21*b* and 21*c*. The outputs $E'_R$, $E'_G$ and $E'_B$ of circuits 21*a*–21*c* are combined in a matrixing circuit 22** in proportion to their contribution to the total luminance of the scene to be televised to produce a signal $E'_Y$ (equal to $0.30E'_R+0.59E'_G+0.11E'_B$) representative of the luminance of the scene to be televised; and, in addition, the signals $E'_R$, $E'_G$ and $E'_B$ are combined in proportions indicated below to produce chrominance signals $E'_1$(equal to $-0.827E'_R+1.000E'_G-0.172E'_B$)

and $E'_2$(equal to $-0.069E'_R+0.799E'_G-0.720E'_B$)

the signals $E'_1$ and $E'_2$ being together representative of the chrominance of the picture to be televised. It will be appreciated that each of the signals $E'_1$ and $E'_2$ may have a value which is positive, negative or zero, the value being zero for a white or grey portion of the scene to be televised and also during the blanking periods between successive lines of a frame.

The two chrominance signals $E'_1$ and $E'_2$ are respectively fed to two identical R–C coupled amplifiers 24 and 25. The outputs of the chrominance signal amplifiers 24 and 25 are suitably combined in signal-translating apparatus 26 constructed in accordance with the present invention to restore the direct-current levels of the chrominance signals and described in greater detail below, to produce red, green and blue color-difference signals $(E'_R-E'_Y$, $0.8(E'_G-E'_Y)$ and $0.6(E'_B-E'_Y)$, the color-difference signals being respectively applied to the grids of the three electron guns of a three-color picture tube 27. The luminance signal $E'_Y$ is applied to an R–C coupled luminance signal amplifier 23 whose output is direct-current clamped in a known manner and is applied to the cathodes of the electron guns of the picture tube 27 in such a sense and in such proportions that the net signal voltages respectively applied to the three electron guns correspond to $E'_R$, $0.8E'_G$ and $0.6E'_B$.

The picture tube 27 is arranged to produce a picture of the scene to be televised in response to the applied signals, the necessary convergence and scanning voltages being derived respectively from conventional convergence circuits 34 and deflection circuits 35 whose operation is synchronized with that of the camera 20 by the line synchronizing pulses.

Signal-translating apparatus 26 is basically the same as described in FIGURE 1 and thus includes three identical triode valves 10, 11, and 12 connected in identical circuit arrangements. The anode of each triode 10, 11, and 12 is connected to a positive potential source B+ through anode load resistors 14, 15, and 16, respectively. The grid and cathode of each triode are connected together through individual resistors 28, 29, and 30, respectively, and are preferably of high value. The cathodes of the triodes are connected to ground via a common resistor 13. The output of the chrominance signal amplifier 24 is applied via a capacitor 31 and terminal 10a to the grid of the triode 10, the output of the chrominance signal amplifier 25 is applied via a capacitor 33 and terminal 12a to the grid of the triode 12 and 0.26 of the signal at the output of the chrominance signal amplifier 25 is applied via a capacitor 32 and terminal 11a to the grid of the triode 11.

The proportions of the red, green, and blue component signals $E'_R$, $E'_G$, and $E'_B$ in the input signals to the grids of the triodes 10, 11, and 12 and the intercoupling between the triodes 10, 11, and 12 effected by reason of the common cathode resistor 13 are such that red, blue and green color-difference signals $E'_R-E'_Y$, $0.8(E'_G-E'_Y)$ and $0.6(E'_B-E'_Y)$ appear respectively at the anodes of the triodes 10, 11 and 12, the color-difference signals being respectively fed to the appropriate electrodes of the picture tube 27 as described above.

The direct-current levels of the signals appearing at the anodes of the triodes 10, 11 and 12 are controlled by a train of negative-going pulses of uniform magnitude applied to the cathodes of the triodes 10, 11 and 12, one of the pulses occurring during each blanking period. The pulses are fed via input terminal 17 to the cathodes of the triodes 10, 11 and 12 by means of a driver circuit 36, having an output impedance of high value compared with the value of the resistor 13, from a pulse generator circuit 37 synchronized by the line synchronizing pulses. The pulses have a magnitude greater than that of the positive peaks of each of the signals applied to the grids of the triodes 10, 11 and 12 and the capacitors 31, 33 and 32 each provide a discharge time constant which is long compared with the period between consecutive pulses; consequently, grid current flows in each of the triodes 10, 11 and 12 only during the application of the pulses. These grid currents cause the capacitors 31, 33 and 32 to be charged to such potentials, in operation, that the direct-current levels of the color-difference signals appearing at the anodes of the triodes 10, 11 and 12 are substantially constant, being effectively dependent only on the magnitude of the applied pulses and independent of other factors, such as the characteristics of the triodes and the potential of the supply source B+. In addition, since the same pulse is used to set the direct-current level for all three color-difference signals, the possibility of undesirable changes in the ratio of the direct-current levels of the three color-difference signals is substantially eliminated.

It will be understood that, in addition, the magnitude of the pulses at input terminal 17 must be chosen so that the triodes 10, 11 and 12 operate on suitably linear portions of their characteristics and none of the triodes is cut off at any time during operation.

The values quoted above for the proportions of the signals $E'_R$, $E'_G$ and $E'_B$ in signals $E'_1$ and $E'_2$ and for the fraction of the signal $E'_2$ applied to the grid of the triode 11 are calculated as follows:

Using the symbols used in the derivation of equations above, in the apparatus of FIGURE 2, $$p=\frac{l}{m}g=\frac{0.30}{0.59}\times 0.8=0.406$$

$$q=\frac{n}{m}g=\frac{0.11}{0.59}\times 0.8=0.149$$

$$b=0.6$$

and since the input to the grid of the triode 11 is derived from the $E'_2$ signal only, $c=0$.

Substituting these values for $b$, $p$, $q$ and $c$ in Equation 11 gives: A=0.245.

By substituting these values of A, $b$, $p$ and $q$, in Equations 8 and 9, it can be deduced that therefore:

$$v_1\alpha-0.41(R-Y)-0.11(B-Y)=-0.827R+1.000G-0.172B$$

and $$v_2\alpha-0.146(R-Y)-0.27(B-Y)=-0.069R+0.799G-0.720B$$

and substituting the values of A, $p$, $b$ and $q$ in Equation 12 gives $$d=0.26$$

so that $$v_3=0.26.v_2$$

It will be appreciated that the value of A depends on the characteristics of the triodes 10, 11 and 12 and the values of the resistors 13–16.

In one arrangement which has been used in practice details of the components of the signal-translating apparatus 26 are as follows:

| | |
|---|---|
| Triodes **10**, **11** and **12** | ½ double triode type 12BH7. |
| Resistors **14–16** | 12.2 kilohms. |
| Resistors **28–30** | 1 megohm. |
| Resistor **13** | 1 kilohm. |
| Capacitors **31–33** | 1000 picofarads. |
| B+ supply | 400 volts. |

Taking the amplification factor and anode resistance of a valve type 12BH7 to be 16.5 and 5.3 kilohms respectively, components of these values give a value of 0.25 for A.

It will be fully appreciated by those familiar with the art of color television that the signal-translating apparatus described herein, although initially designed for use in a color-television monitor system, is equally applicable to the chrominance channel of a color-television receiver and the manner in which it would be so used is readily apparent. From the foregoing description it will also be appreciated that the phrases "direct-current restoring" and "clamping of the direct-current levels" are intended to be synonomous.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

In color-television apparatus, signal-translating apparatus for clamping the direct-current level of color-difference signals used to drive a color image tube requiring unequal signal drives, said signal-translating apparatus comprising:

at least three identical electric valve circuits, each having a valve with an anode, a cathode, a control grid, an anode resistance $R_a$, and an amplification factor $\mu$, each circuit having equal anode load impedances $R_L$ and a common cathode circuit impedance $R_c$;

means for supplying three color-difference signals respectively to individual ones of said three control grids in the proportions:

$$[1-A(2+p)](R-Y)+A(b-q)(B-Y):$$
$$A(1-p)(R-Y)+[b-A(2b+q)](B-Y):$$
$$[-p+A(2p+1)](R-Y)+[-q+A(2q+b)](B-Y)$$

where $$A=\frac{(\mu+1)R_c}{R_L+R_a+3(\mu+1)R_c};\ p=\frac{l}{m}g;\ q\frac{n}{m}g$$

$(R-Y)$, $(G-Y)$, and $(B-Y)$ are color-difference signals; $b$ and $g$ are numbers other than zero and represent the ratios of output signals across two of said anode loads $R_L$ in relation to the output signal across the third of said anode loads $R_L$, and $l$, $m$ and $n$ are coefficients of the equation for the luminance signal $lR+mG+nB=Y$;

said supply means including individual time-constant circuits, the time constants thereof being long compared with a period of one line scan of a color-television signal associated with each control grid;

and means for supplying across said common cathode impedance $R_c$ a train of pulses of uniform magnitude, both the magnitude and polarity such that grid current flows in all said valves only during the application thereto of the pulses.

References Cited in the file of this patent

UNITED STATES PATENTS

| | | |
|---|---|---|
| 2,732,425 | Pritchard | Jan. 24, 1956 |
| 2,843,666 | Preisig | July 15, 1958 |
| 2,935,556 | Barco | May 3, 1960 |
| 2,980,761 | Pritchard et al. | Apr. 18, 1961 |
| 3,062,914 | Fernald et al. | Nov. 6, 1962 |

OTHER REFERENCES

RCA Chassis No. CTC7AA, RCA Service Data 1958 No. T10, pp. 32 and 33. (First printing July 29, 1958.)